July 14, 1970  R. F. WALLACE  3,520,377
CONVERTIBLE MODE OF MOVEMENT FOR VEHICLE WHEEL
Filed Aug. 25, 1969

INVENTOR.
RICARDO F. WALLACE
BY
SOKOLSKI & WOHLGEMUTH
ATTORNEYS

United States Patent Office 3,520,377
Patented July 14, 1970

3,520,377
CONVERTIBLE MODE OF MOVEMENT
FOR VEHICLE WHEEL
Ricardo F. Wallace, 2741 Vista Mesa Drive,
Miraleste, Calif. 90732
Filed Aug. 25, 1969, Ser. No. 852,561
Int. Cl. B60b 37/00
U.S. Cl. 180—7                                    10 Claims

ABSTRACT OF THE DISCLOSURE

The wheel axles of the vehicle have end portions thereon which extend at a predetermined angle away from the axis of rotation of the central portion thereof. The wheel apertures into which the ends of the axles fit are canted away from their associated wheel axes by an angle equal to the angle of the axle end portions. A locking device is provided to lock the wheels to the axles in any one of a plurality of rotational positions relative thereto. With a wheel locked in a position whereby it is perpendicular to the rotation axis of the central portion of its associated axle, normal wheel rotation is attained. With a wheel locked to the axle in a position whereby it is not normal to its associated axle central portion rotation axis, a sculling or wobble type motion is attained, the degree of wobble being a function of the degree of angular departure from the axle central portion rotation axis.

---

This invention relates to vehicle wheel movement and more particularly the conversion of wheel operation from straight rotary to wobble type operation.

For vehicles to be used over rough terrain of all types such as, for example, that encountered in military, exploratory, or outland operations, normal type rotary wheel operation has been found to be inadequate. Thus, the wheels will become bogged down in sand, marshy terrain, snow and ice, and other such types of terrain which afford poor support surfaces and traction. Further, with ordinary wheel operation the wheels are unsuitable for propulsion through water if such vehicle is to be used amphibiously as both a land and water vehicle. In such cases, either a propeller or auxiliary paddle wheel members are needed. The use of treads of the type generally found in tanks has the disadvantage of providing rather inadequate locomotion on good hard surfaces and further, generally requires auxiliary propulsion means in the case of an amphibious vehicle.

In Pat. No. 1,810,154, a convertible wheel device is described wherein a mechanism is provided for operating the wheel either in normal rotary fashion for normal land transportation or in a wobble type operation for propelling the vehicle through the water. The mechanical means described in this patent for achieving this end result involves a comparatively complicated jacking mechanism operating in conjunction with universal joints connected to the wheel.

The device of the instant invention provides a novel implementation for providing alternative straight rotary or wobble type wheel operation of the general type described in the above indicated patent which offers a significant improvement over this prior device. The device of this invention first has a much simpler, stronger structure requiring less parts and lends itself to more economical fabrication. Further, the device of this invention has a structure which more readily lends itself to reliability of operation in that the wheel is mounted directly on the axle and not attached through intermediary couplings which might impair structural integrity, as in the device of the prior art patent. Still further, the device of the invention lends itself to a very simple mechanical expediency for converting from one type of operation to the other which merely involves the rotation of the axle relative to the wheel or vice versa.

It is, therefore, the principal object of this invention to provide an improved device for converting vehicle wheel operation between straight rotary movement and sculling or wobble type movement.

Figure 1A:
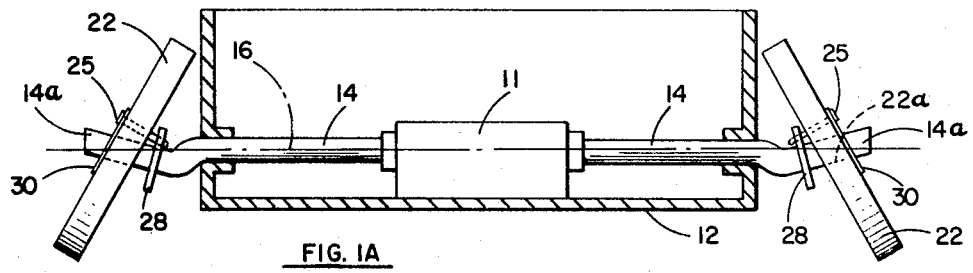
Figure 1B:
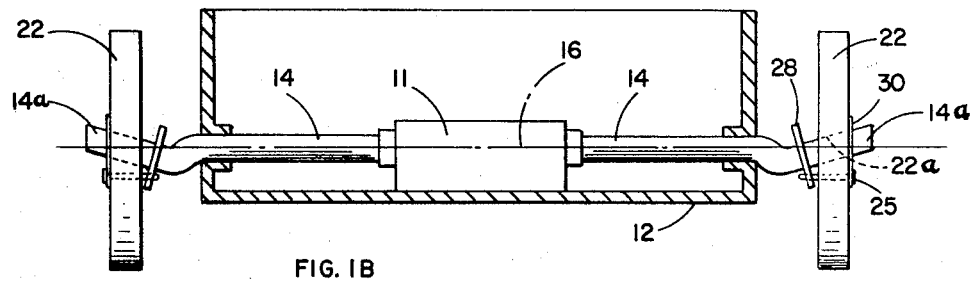
Figures 2, 3:
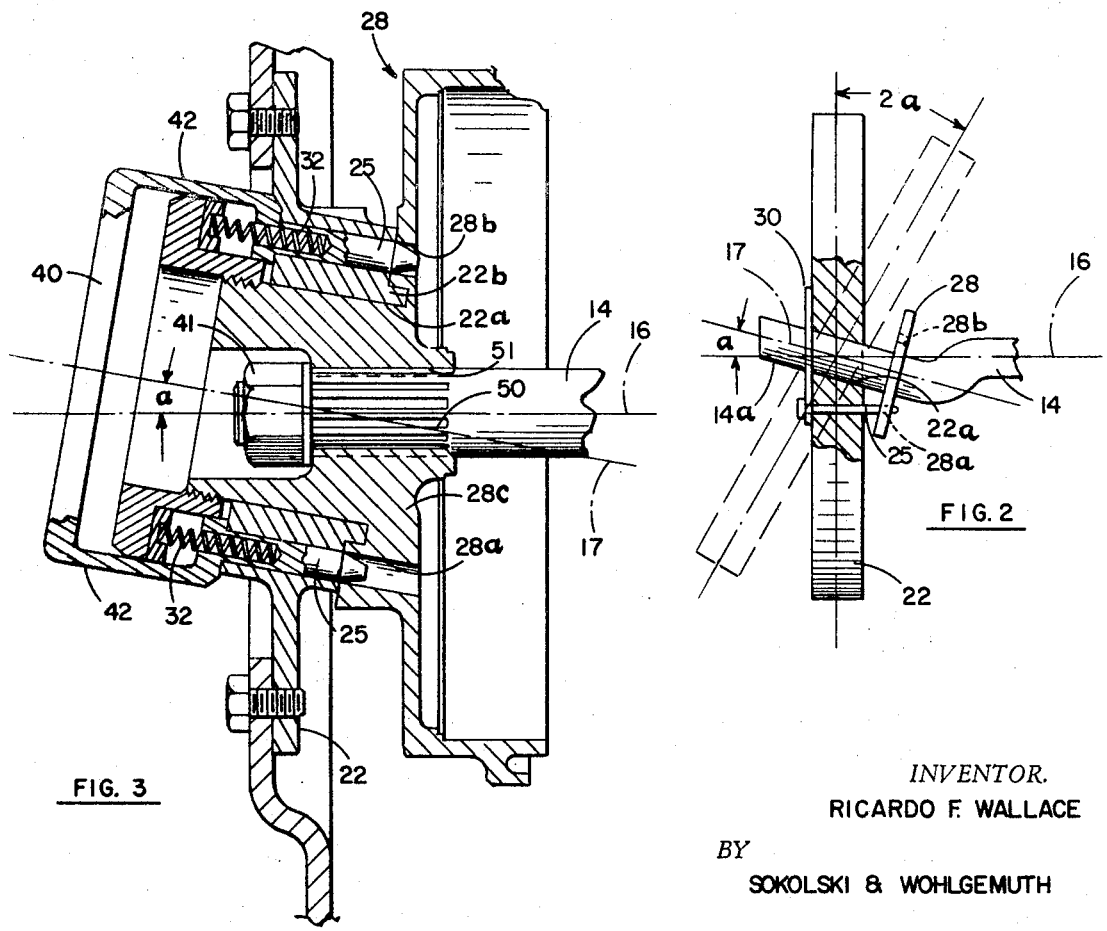

Other objects of this invention will become apparent as the description proceeds in connection with the accompanying drawings of which, FIG. 1a is a schematic drawing illustrating one embodiment of the device of the invention set in its sculling or wobble mode of operation, FIG. 1b is a schematic drawing illustrating this one embodiment in a normal rotary mode of operation, FIG. 2 is a schematic drawing illustrating the wheel and bent axle portion of the embodiment of FIGS. 1a and 1b, and FIG. 3 is a cross sectional view in elevation of the wheel structure and locking mechanism of another embodiment of the device of the invention.

Briefly described, the device of the invention comprises a vehicle having wheel axles with end portions which extend away from the axle rotation axes at a predetermined angle. The wheel apertures into which the axle end portions fit are canted away from the wheel rotation axis at this same predetermined angle. Means are provided to lock the wheel in one of a plurality of rotational positions relative to the axle; in one of these positions the wheel being perpendicular to the axle central portion's rotation axis to provide normal wheel operation; in all other positions, the wheel operating with a wobble or sculling motion.

Referring now to FIGS. 1a, 1b and 2, one embodiment of the invention is schematically illustrated. The transmission 11 of vehicle 12 rotatably drives axle 14 about axis 16. The axle end portions 14a are bent away from axis 16 so that their longitudinal axes 17 for an angle $a$ with axis 16 (see FIG. 2).

The bent axle end portions 14a fit through mating apertures 22a formed in wheels 22. For normal rotary motion, wheel apertures 22a are canted relative to rotation axis of the wheel at an angle which corresponds to the bend angle (angle $a$) of the axle. Wheels 22 are locked to their associated axles 14 in any one of a plurality of positions rotatably oriented relative thereto by means of locking pins 25 which fit through one of apertures 28a or 28b formed in plates 28 fixedly attached to axle 14 and plates 30 fixedly attached to wheels 22.

As shown in FIG. 1b, the wheels are locked to the axle in a position for normal rotational movement as would be the case in traveling along a hard surfaced road. It is to be noted that in this instance the rotation axis of the wheel lies along the axle rotation axis 16. As shown in FIG. 1a, wheel 22 has been rotated 180° relative to axle 14 from the position indicated in FIG. 1b. Locked in this position by means of pins 25, the wheels will wobble back and forth in a sculling type motion as they are rotated with the axle. This type of action, it has been found, provides excellent propulsion through the water and also is quite useful in passing through soft fluids media, such as sand mud or the like, the in and out motion coupled with the rotation tending to prevent the wheels from burrowing themselves into such media. It is also to be noted that in going from water to land that the wobble type mode of operation, while not making for the most comfortable ride, still has the capacity to continue to propel the vehicle.

The amount of wheel wobble for any position of the wheels relative to the axle is a function of the angle $a$ at which the ends of the axle are bent and the relative rotational position between that shown in FIG. 1b and that shown in FIG. 1a at which the wheels are locked to the axle. Thus, the maximum amount of wobble is achieved with the wheels rotated relative to the axle 180° away from the position shown in FIG. 1b (as shown in FIG. 1a) with various degrees of wobble being achieved at different positional setting between that of FIGS. 1a and 1b.

It is further to be noted that operation can be converted from one mode to the other merely by removing the locking pins 25, energizing transmission 11 until axle 14 moves to the newly desired position relative to the wheels, and then using the locking pins to relock the wheels to the axle.

Referring now to FIG. 3, the wheel axle and locking mechanism of another embodiment of the invention are illustrated. In this embodiment, the end portions on the axles rather than being integrally formed therewith are comprised by portions 28C of machined hub-brake drum 28. The aperture in hub-brake drum portion 28c in which the axle fits, the centerline of which is aligned with axle rotation axis 16, is canted away from the central axes 17 of portion 28c by angle a. The aperture 22a in wheel hub 22 is likewise canted by an angle a with respect to the rotation axis of the wheel, as in the first embodiment. The axle is locked to wheel hub 22 in any desired position by means of one or more locking pins 25 which are urged by means of associated springs 32 into apertures 28a and 28b formed in the hub-brake drum 28. Hub-brake drum 28 is fixedly attached to axle 14 by means of nut 41 and prevented from rotating relative thereto by splines 50 and 51 formed in the axle and hub-brake drum, respectively. Pins 25 are slidably supported in wheel hub structure 22b which is supported for adjustable rotational positioning on end portion 28c of the brake drum. In setting the wheel in a new position relative to the axle, pins 25 are withdrawn from apertures 28a and 28b by means of handle 40 which is connected to the pin by means of U-shaped bar members 42, and either the wheel or axle rotated to the newly desired position. A number of apertures such as apertures 28a and 28b may be provided around the wheel to permit various positionings thereof relative to the axle so as to provide various degrees of wobble motion.

Thus, it can be seen that the wheel can be readily set relative to the axle for various modes of operation by merely releasing the pins 25 from engagement with the axle hub-brake drum and then slowly driving the axle until a new position has been reached. It is to be noted that if so desired a solenoid or other type of actuator could be utilized to move the pins 25 out of engagement with the axle hub-brake drum while a new position is being selected.

The device of this invention thus provides a simple, economical and highly reliable mechanism for converting the operation of the wheels of a vehicle from straight rotary to various degrees of wobble operation. This conversion can be made in a minimal amount of time with a minimal amount of effort making the device highly suitable for use where versatility of operation is required under adverse operating conditions.

I claim:
1. In a vehicle, said vehicle including a wheel axle, wheels attached to the end portions of said axle and means for rotatably driving the axle about a rotation axis, the improvement comprising means for enabling the conversion of the motion of said wheel between straight rotary motion and wobble motion including:
end portions on said axle extending at a predetermined angle away from said rotation axis,
said wheels having apertures formed therein for receiving said axle end portions, said apertures being canted away from the rotation axis of the wheels at an angle equal to the angle at which the axle end portions extend away from the axle rotation axis, and
means for holding said wheels to said axle end portions in any one of several relative rotational positions, one of said positions providing regular rotary motion of said wheels, any other of said positions providing wobble motion of said wheels.

2. The device of claim 1 wherein said means for holding each of said wheels to an axle end portion includes a pin member, a plate member fixedly attached to said axle, said plate member and said wheel each having apertures formed therein through which the pin member is inserted.

3. The device of claim 1 wherein said axle end portions are integrally formed with said axle and are bent away from the rotation axes thereof.

4. The device of claim 1 wherein said axle end portions comprise hub members attached to the ends of the axles.

5. The device of claim 2 wherein said plate member has a plurality of apertures located on a circle concentric with the axle end portion.

6. The device of claim 2 and further comprising spring means for urging said pin member into holding engagement with said wheel and said plate member.

7. The device of claim 6 and further including handle means for retracting said pin member from said holding engagement.

8. In a vehicle,
a wheel axle,
means for rotatably driving said axle about its longitudinal axis,
end portions on said axle extending at a predetermined angle away from said axis,
said wheels having apertures formed therein for receiving said axle end portions,
said apertures being canted away from the rotation axes of said wheels at said predetermined angle, and
means for selectively holding said wheels to said axle end portions in any one of a plurality of relative rotional positions.

9. The device of claim 8 wherein said holding means comprises pin means for alternatively holding each of said wheels to said axle in one position wherein said wheels have regular rotational motion or another position wherein said wheels have wobble motion.

10. The device of claim 9 wherein said holding means additionally includes plate means attached to said axle having apertures formed therein for receiving said pin means, said wheels having apertures therein, said pin means being adapted to fit through said wheel and plate means apertures.

References Cited

UNITED STATES PATENTS

| | | | |
|---|---|---|---|
| 1,810,154 | 6/1931 | Alig | 115—1 |
| 1,810,635 | 6/1931 | White | 180—75 |
| 1,834,240 | 12/1931 | Gledhill | 301—132 |
| 2,207,780 | 7/1940 | Brown. | |
| 2,683,495 | 7/1954 | Kopczynski | 301—5 X |
| 2,926,032 | 2/1960 | Cook | 287—52 |
| 2,926,735 | 3/1960 | Cook | 180—42 |
| 3,363,713 | 1/1968 | Blonsky | 280—229 X |

KENNETH H. BETTS, Primary Examiner

U.S. Cl. X.R.

280—80; 301—132